United States Patent
Evans et al.

(10) Patent No.: US 6,542,661 B2
(45) Date of Patent: Apr. 1, 2003

(54) METHOD FOR UPGRADING BANDWIDTH IN AN OPTICAL SYSTEM UTILIZING RAMAN AMPLIFICATION

(75) Inventors: Alan F. Evans, Beaver Dams, NY (US); Ashiqur Rahman, Allen, TX (US); George F. Wildeman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/827,420

(22) Filed: Apr. 6, 2001

(65) Prior Publication Data

US 2002/0191898 A1 Dec. 19, 2002

(51) Int. Cl.⁷ .............................. G02B 6/28; H01S 3/00
(52) U.S. Cl. .................... 385/24; 359/124; 359/341; 359/345; 372/75
(58) Field of Search ........................ 385/24.37; 359/89, 359/126, 127, 130, 341, 345; 372/70, 71, 75

(56) References Cited

U.S. PATENT DOCUMENTS

| | | | |
|---|---|---|---|
| 5,959,750 A | 9/1999 | Eskildsen et al. | |
| 6,088,152 A | 7/2000 | Berger et al. | |
| 6,101,024 A | 8/2000 | Islam et al. | |
| 6,236,498 B1 * | 5/2001 | Freeman et al. | 359/341 |
| 6,236,499 B1 * | 5/2001 | Berg et al. | 359/341 |
| 6,292,288 B1 * | 9/2001 | Akasaka et al. | 359/334 |

* cited by examiner

*Primary Examiner*—Hemang Sanghavi
(74) *Attorney, Agent, or Firm*—Svetlana Z. Short; Thomas W. Cole (57) ABSTRACT

A method for upgrading bandwidth in a fiber optic system utilizing Raman amplification and having an initial band capacity provided by a plurality of pumps including the steps of identifying a fiber optic system to be upgraded, activating at least one new pump in the fiber optic system necessary to provide upgraded band capacity to the fiber optic system while retaining the initial band capacity provided by the plurality of pumps, and adjusting power of at least one pump of the fiber optic system to minimize gain ripple or signal output ripple.

22 Claims, 5 Drawing Sheets

METHOD FOR UPGRADING BANDWIDTH IN AN OPTICAL SYSTEM UTILIZING RAMAN AMPLIFICATION

BACKGROUND OF THE INVENTION

1. Field of the Invention

The present invention is directed to methods for upgrading bandwidth in a fiber optic system. More specifically, the present invention is directed to methods for upgrading bandwidth in a fiber optic system that utilizes Raman amplification.

2. Description of the Related Art

To increase the bandwidth of optical fibers, two key amplification technologies have been developed and used by the telecommunication industry: erbium-doping and stimulated Raman scattering. While both of these technologies have proven useful in increasing band width, there are shortcomings associated with each.

Silica-based optical fiber has a lowest loss window around 1550 nm with approximately 25 THz of bandwidth between 1430 and 1620 nm. In this wavelength region, erbium-doped fiber amplifiers (EDFAs) are widely used. However, the absorption band of an EDFA nearly overlaps its emission band. For wavelengths shorter than about 1525 nm, erbium-atoms in typical glasses will absorb more than amplify. Consequently, the full bandwidth potential for silica-based optical fibers have not been attained. To broaden the gain spectra of EDFAs, the silica core of the optical fibers have also been doped with aluminum or phosphorus to broaden the emission spectrum. Nevertheless, the absorption peak for the various glasses is still approximately 1530 nm, which narrows the usable bandwidth. As discussed in the prior art section of U.S. Pat. No. 6,101,024 to Islam et al., two-band architecture for an ultra-wideband EDFA has been proposed with an optical bandwidth of 80 nm. To obtain a low noise figure and high output power, the two bands share a common first gain section and have distinct second gain sections. In particular, the 80 nm wavelength bandwidth comes from one amplifier (for conventional band or "C-band") from 1525.6 to 1562.5 nm, and another amplifier (for long band or "L-band") from 1569.4 to 1612.8 nm. In another proposed system, a 54 nm gain bandwidth is achieved with two EDFAs in a parallel configuration, i.e., one optimized for 1530–1560 nm and the other optimized for 1576–1600 nm. However, such systems require the use of additional optical repeaters to achieve the multiple wavelength transmissions. Thus, as can be readily appreciated by one of ordinary skilled in the art, such an upgrade method would require a significant capital investment and would also render different nodes of the network inoperable at different times thereby potentially disrupting service to many subscribers.

Raman amplification is disclosed in U.S. Pat. No. 5,959,750 to Eskildsen et al. for increasing transmission capacity. Here, amplification occurs directly in the transmission fibers of the fiber optic system itself. For a system that relies entirely on Raman amplification, the need for specially doped fibers is obviated. Thus, the use of Raman gain as taught by Eskildsen et al. facilitates the upgrade of a transmission system without significant cost. This use of Raman amplification is referred to as distributed Raman-assisted transmission (D-RAT), and is implemented via counter-propagation (with respect to the signals) of pump light which is downshifted by approximately 100 nm from the signal wavelength band. In addition to lower cost, D-RAT offers the benefit of lower accumulated amplified spontaneous emission (ASE) noise build-up and lower launch power for decreased fiber nonlinearities. So D-RAT acts as a low noise, pre-amplifier before each in-line EDFA in a long-haul transmission link to improve system performance (as measured by Q) by several decibels (dB). The Q improvement can be used in a variety of ways but increased system reach beyond 1000 km and up to 3000 km has received the most interest since it has immediate commercial applicability and obviates the need for expensive electrical 3R regenerators. Unfortunately, the use of D-RAT to increase bandwidth is very difficult to implement effectively due to the Raman gain/tilt and other nonlinearities, all of which are discussed in U.S. Pat. No. 6,088,152 to Berger et al. To solve these problems, Berger et al. proposes preconditioning of the optical signals prior to transmitting the signals over an optical fiber span. Such preconditioning may either generate a gain that is pre-tilted opposite to the Raman gain/tilt, or may filter the Raman tilt/gain out of the received optical signals before the signals are re-transmitted.

While Berger et al. poses one possible solution to the Raman gain/tilt and nonlinearities, such preconditioning by generating an opposing gain or by filtering is also difficult and costly to implement. In addition, such preconditioning is not easily retrofittable and thus does not provide an easy and economical method for upgrading bandwidth in already installed fiber optic systems. Accordingly, there exists an unfulfilled need for a method for upgrading bandwidth in existing fiber optic systems which provides a substantial increase in the data carrying capacity without the disadvantages of the prior art systems and methods.

BRIEF SUMMARY OF THE INVENTION

The present inventors have found that upgrading the signal bandwidth, for instance, from an initially installed system having only C-band capacity to an upgraded system also having L-band capacity, is very complicated due to the fact that Raman amplification is a nonlinear process, and also because of the transfer of unwanted pump-to-pump and signal-to-signal energy in addition to the desired pump energy transfer to the signals. As used herein, Raman gain may be defined as the ratio of the signal output power with the Raman pump(s) on to that of the signal output power with the Raman pump(s) off. The present inventors have observed that Raman scattering and amplification results not only in the transfer of energy between the pump and signal wavelengths, but also between the multiple wavelength pumps and between the signals. This in turn makes the addition and management of the new bandwidth very difficult since any additional pump wavelengths for providing gain in the new band also provides gain to the old band and redistributes the existing pump energy in a complex way. Finally, the inventors have observed that the optimized initial bandwidth (before upgrade) of the installed fiber optic systems is not necessarily maintained as more pumps are added to increase the bandwidth.

The present invention provides an improved method for upgrading bandwidth in a fiber optic system that utilizes Raman amplification with the advantage that the upgrade can be attained easily and cost effectively in already installed fiber optic systems, and without the aforementioned disadvantages. One embodiment of the improved embodiment includes the steps of identifying a fiber optic system to be upgraded, the fiber optic system utilizing Raman amplification and having an initial band capacity provided by at least one existing pump, activating at least one new pump in the fiber optic system necessary to provide upgraded band capacity to the fiber optic system while retaining the initial band capacity provided by the existing pump, and adjusting power of at the least one existing pump or the new pump of the fiber optic system to minimize at least one of gain ripple and signal output ripple.

The fiber optic system is at least one of a fiber optic network, a segment of a fiber optic network, a discrete Raman amplifier, or a loss-less dispersion compensating module. The pumps of the fiber optic system may be Raman laser diode pumps. In this regard, the Raman pumps may be semiconductor Fabry-Perot type laser diodes.

Another embodiment of the method includes the step of installing the at least one new pump necessary to provide upgraded band capacity to the fiber optic system before activating the at least one new pump. In one embodiment, three pumps of the fiber optic system may be adjusted to minimize gain ripple.

The present invention may be used to upgrade a fiber optic system where the initial band capacity of the fiber optic system before the upgrade includes C-band capacity, and the upgraded band capacity includes L-band capacity. In this regard, the step of adjusting power of at least one of the existing pump and the new pump of the fiber optic system includes adjusting the power of the at least one existing pump that provides initial C-band capacity to minimize gain ripple or to minimize signal output ripple. The present invention may also be used to upgrade a fiber optic system where the initial band capacity of the fiber optic system before the upgrade includes L-band capacity, and the upgraded band capacity includes C-band capacity. In this regard, the step of adjusting power of at least one of the existing pump and the new pump of the fiber optic system includes adjusting the power of the at least one existing pump that provides initial L-band capacity to minimize gain ripple or to minimize signal output ripple.

Moreover, the linear gain/tilt of the fiber optic system from signal-to-signal Raman gain may be corrected with a variable optical attenuator in an in-line erbium-doped fiber amplifier. Alternatively, the powers of the Raman pumps can be adjusted to correct the signal gain tilt. In yet another embodiment, the initial wavelength band is provided with a flat Raman pump on/off gain whereas the expanded wavelength band has flat power across the signals.

Lastly, the present method may further include the steps of providing a C-band wavelength division multiplexer (WDM) coupler that allows addition of wavelengths of a C-band pump to a signal fiber, and providing a separate L-band wavelength division multiplexer (WDM) coupler that allow addition of wavelengths of an L-band pump the signal fiber, wherein the WDM couplers are ordered in a manner that the L-band wavelengths pass through the C-band WDM coupler but the C-band wavelengths do not pass through the L-band WDM coupler.

These and other features and advantages of the present invention will become more apparent from the following detailed description of the preferred embodiments of the present invention when viewed in conjunction with the accompanying drawings.

DETAILED DESCRIPTION OF THE INVENTION

Figure 1:
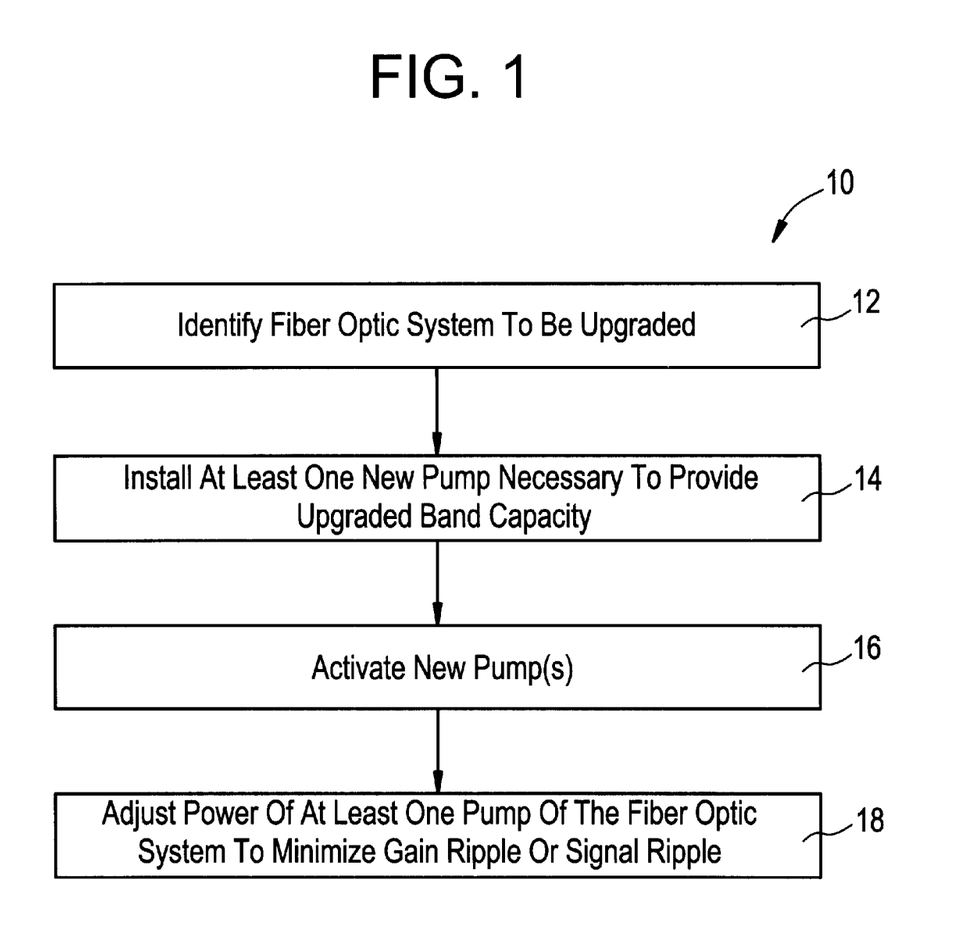
FIG. 1 shows a schematic flow diagram of a method for upgrading bandwidth in accordance with one embodiment of the present invention.

The present invention described herein below provides an improved method for upgrading bandwidth which will substantial increase in the data carrying capacity of existing fiber optic systems without the disadvantages of the prior art systems and methods described previously. FIG. 1 schematically shows one example embodiment of the method for upgrading bandwidth 10 in accordance with the present invention. As can be clearly seen, the example method includes the initial step of identifying a fiber optic system to be upgraded as shown in block 12. The fiber optic system to be upgraded preferably utilizes Raman amplification and has an initial band capacity provided by at least one pump and preferably, a plurality of pumps. In this regard, the fiber optic system may be a fiber optic system initially having C-band capacity which is to be upgraded to also include L-band capacity, or alternatively, may be a fiber optic system initially having L-band capacity which is to be upgraded to also include C-band capacity. Moreover, the upgraded fiber optic system need not be a fiber optic network, but instead, may also be a segment of a fiber optic network, discrete Raman amplifiers, or loss-less dispersion compensating modules (DCMs) as well. In this regard, it should be kept in mind that the term fiber optic system should be construed to include such discrete Raman amplifiers, and loss-less DCMs as well as fiber optic networks or segments thereof, the segments including transmission fiber, distributed Raman amplifies and erbium-doped fiber amplifier.

FIG. 1 also illustrates an optional block 14 which provides an optional step of installing at least one new pump necessary to provide upgraded band capacity. As can be seen in block 16, the new pump(s) is activated in the fiber optic system to thereby provide upgraded band capacity to the fiber optic system. The plurality of pumps that provided the initial band capacity are retained so that the initial band capacity is also retained. In this regard, the pumps of the fiber optic system including the initially provided pumps as well as the installed new pump(s) may be Raman laser diode pumps. Preferably, the pumps of the fiber optic system are Fabry-Perot type semiconductor laser diode pumps. It should also be noted that the step of installing at least one new pump as shown in block 14 is considered to be optional since the initially installed fiber optic system may already have unactivated pumps in anticipation of future upgrades. In such a case, the unactivated pump may be activated in step shown in block 16. In this regard, such an unactivated pump is considered to be "new" in the sense that it was previously unused in the fiber optic system.

In addition, in accordance with the present invention, the power of at least one pump of the fiber optic system is adjusted to minimize gain ripple or signal output ripple as shown in block 18. Gain ripple may be defined as the maximum gain minus the minimum gain over the range of the signal wavelengths and is often normalized by dividing by the minimum gain. The signal output ripple may be defined as the power variation in the signal output of the fiber optic system. In this regard, signal output ripple is maximum signal output power minus the minimum signal output power. The signal output power may be measured at the output of the Raman module after the signals have been amplified by the pumps and other signals, and attenuated by the fiber loss. The adjusted pump(s) may be one or more of the plurality of pumps that provided the initial band capacity or the newly activated pump(s) of block 18. In one preferred embodiment, powers of at least three pumps of the fiber optic system is adjusted to minimize gain ripple. It should also be noted that gain ripple refers to the variation in gain along the various wavelengths and thus, minimizing gain ripple can be thought of as flattening the gain characteristics.

In the following discussion, an example optical fiber system that is upgraded in bandwidth in accordance with one embodiment of the present invention is described in detail to further clarify the invention. In the present example, the bandwidth of an existing fiber optic system that uses multiple pump wavelengths with nominal constant power at each wavelength is upgraded and increased in accordance with the present method while the total output power before and after the bandwidth upgrade remains relatively constant, for example, at approximately 500 mW. The Raman amplification creates a linear gain/tilt because the signal-to-signal power transfer is not taken into account in the design of the Raman amplifier. In this example, this gain/tilt may be corrected with a variable optical attenuator in the in-line EDFA placed after the Raman input WDM. In addition, the transfer of unwanted pump-to-pump and signal-to-signal energy also makes the addition and management of the new bandwidth very difficult while the optimized initial bandwidth of the installed fiber optic systems is likely to be no longer optimized. Thus, in accordance with the present invention, at least one pump wavelength is chosen and the power of the corresponding pump is adjusted to minimize gain ripple or signal output ripple. The inventors of the present invention have found that noise and it's spectral dependence, are substantially insensitive to choice of pump wavelength over a narrow signal band such as a 32 nm C-band. Additionally, signal-to-signal gain tilt is within a controllable level by adjusting a variable optical attenuator in the EDFA. Therefore, optical signal-to-noise spectral variation which is most important in a noise-dominated transmission system is minimized by adjusting the power of one or more pumps to minimize the gain ripple. However, in a full C-band plus L-band upgrade, pump to pump power transfer creates a large tilt in the noise spectrum and signal-to-signal power transfer creates a large tilt in the signal output power spectrum. Therefore, the inventors have found it desirable to minimize the signal output ripple by adjusting the power of one or more pumps in the upgraded, full C-band and L-band system.

It should be noted that the term "pump" referred to in this specific example is a Raman laser diode pump used in Raman amplification (a.k.a. 14xx nm pumps). It should also be noted that preferably more than one pump wavelength, such as two, three or even more pump wavelengths, may be chosen and the power of the pumps corresponding to the wavelengths may be adjusted so as to allow maximum flexibility in minimizing gain ripple or signal output ripple.

Figure 2:
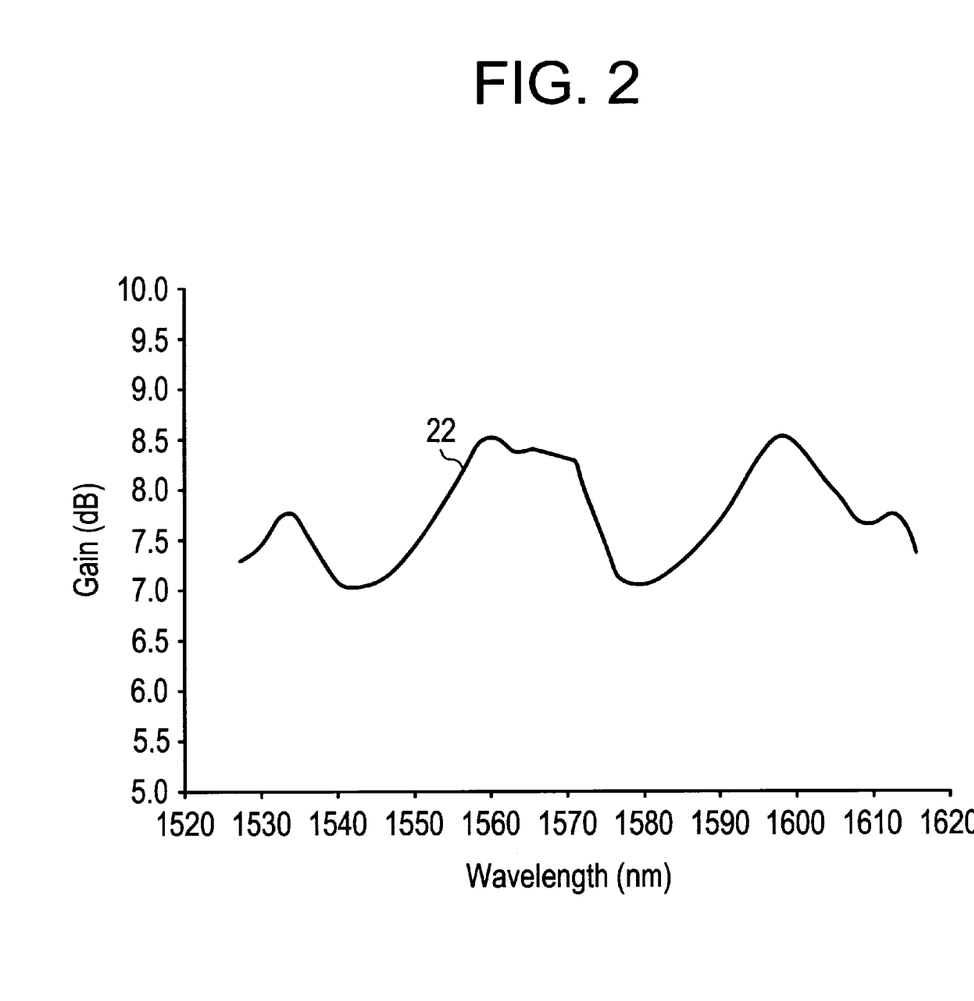
FIG. 2 shows gain characteristics of an example fiber optic system after an upgrade using the method of the present invention in both C-band and L-band and adjusting the pump powers to minimize Raman gain ripple.

FIG. 2 shows gain characteristics in both C-band and L-band of the example fiber optic system after the upgrade using the method of the present invention. More specifically, the example fiber optic system initially only had forty eight (48) 100 GHz spaced, C-band wavelengths from 1527.6 nm to 1565.1 nm. The bandwidth of this fiber optic system was then upgraded and increased to include additional wavelengths in the L-band from 1570 nm to 1613 nm by installing and/or activating a new pump that provides the gain at desired wavelengths, while keeping the pumps of the initially (i.e. before upgrade) installed fiber optic system, i.e. the pumps that provided the C-band wavelengths in the present example.

As discussed previously, because Raman scattering and amplification results not only in the transfer of energy between the pump and signal wavelengths, but also between the multiple wavelength pumps and between the signals, the gain characteristics of the fiber optic system with the increased bandwidth was not desirable. Moreover, as also noted previously, the optimized initial bandwidth of the C-band was also not maintained so that the gain characteristics of even the C-band was also no longer desirable. Thus, in accordance with the present example of the invention, the powers of three of the pump wavelengths in the upgraded fiber optic system of the present example, were adjusted so as to minimize gain ripple to obtain the gain after upgrade indicated by line 22 in both the C-band and the L-band. The specific details of this power adjustment of the pump power at the three of the pump wavelengths in the present example is described in further detail below relative to FIG. 3.

Figure 3:
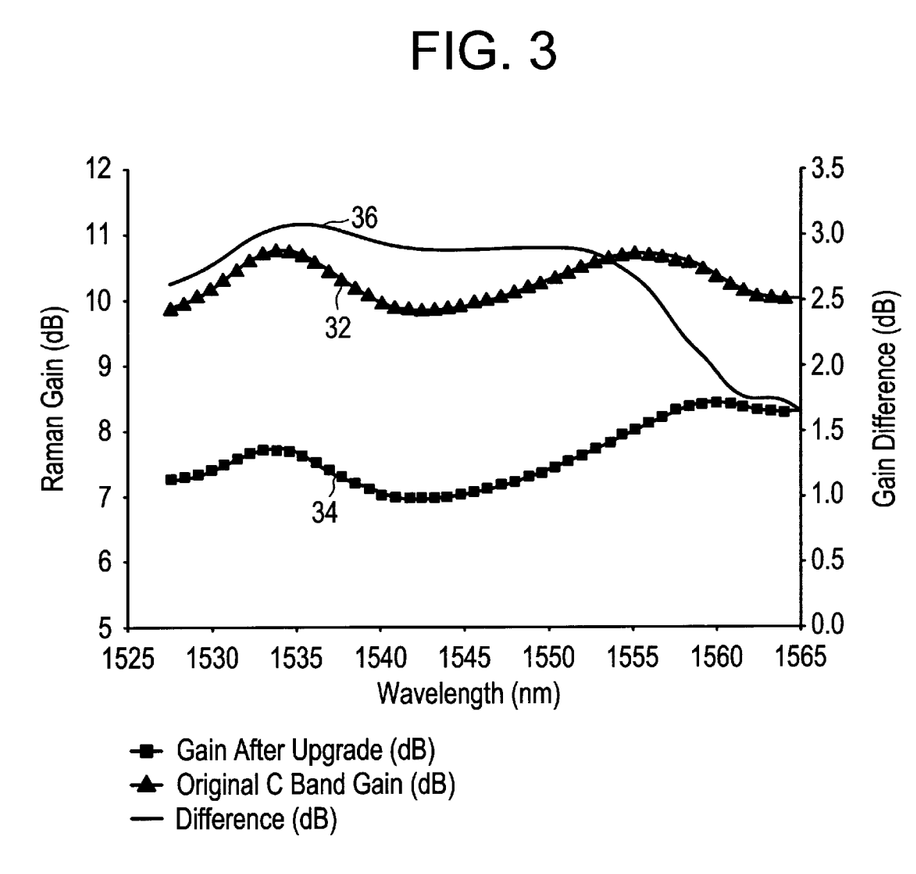
FIG. 3 shows an enlarged view of the C-band gain characteristics of FIG. 2 including the original C-band gain prior to upgrading with the L-band.

FIG. 3 shows an enlarged view of the C-band gain characteristics of FIG. 2. As can be seen, FIG. 3 shows both the original C-band gain represented by line 32, and gain after upgrade (after power adjustment) represented by line 34 using the method of the present invention. Line 32 representing the original C-band gain is marked by triangles while line 34 representing gain after the upgrade in accordance with one embodiment of the present invention is marked by squares. It should be noted that the line 32 and line 34 are shown in FIG. 3 as being marked by triangles and squares respectively for clarity purposes but do not have any other significance except to merely allow a person to more readily distinguish line 32 from the line 24 discussed below. In addition, as previously noted relative to FIG. 2, these characteristics are for an example fiber optic system having forty eight (48) 100 GHz spaced, C-band signals from 1527.6 nm to 1565.1 nm. In existing commercial systems that operate in the C-band, this is the widest conventional bandwidth. Thus, the characteristics as shown in FIG. 3 may be representative of the results which may be obtained in comparable commercial fiber optic systems. Line 36 of FIG. 3 also shows the difference in decibels (dB) between the original C-band gain and the gain after the upgrade in accordance with the illustrated example of the present invention, the difference value scale being illustrated on the right vertical axis of FIG. 3. Part of this difference between the original C-band gain of line 32 and the gain after the upgrade of line 34 is due to the well known property of pump depleted gain saturation. If the power levels of the input signal were decreased from 2 dBm (decibels above 1 milliwatt) per channel which is used in the present example, the magnitude of the difference as shown by line 36 would also decrease.

The initial existing fiber optic system (before upgrade) was optimized to have C-band gain characteristics as shown in line 32 of FIG. 3 to minimize gain ripple in the C-band wavelengths. In accordance with one embodiment of the present invention, two pump wavelengths at 1426.5 and 1455 nm were found that provided the flattest gain ripple of approximately 0.9 dB while giving the highest minimum gain of approximately 10 dB as can be seen in line 34 of FIG. 3. The highest minimum gain, i.e. the largest gain of the weakest wavelength channel, provides an indication that pump wavelengths that allow maximum pump efficiency have been chosen. Of course, it should be appreciated that the pump wavelengths discussed above are examples only and in other applications and systems, different pump wavelengths and different numbers of pump wavelengths may be adjusted to attain a relatively flat gain ripple.

In the present example of the fiber optic system, pump powers at the input of the transmission fiber of 171 mW and 228 mW for 1426.5 nm and 1455 nm respectively were provided to each wavelength of the fiber optic system so that with approximately 1 dB of connector insertion loss, the power out of the Raman module box is approximately 500 mW. The upper limit of 500 mW was chosen for eye safety reason to conform with the OSHA standard for class IIIb lasers. Of course, it should be appreciated that other amount of power may be used in other embodiments applying the present invention and the above are merely provided as one example.

Through numerical simulations using 100 km of LEAF® optical fiber from Corning Incorporated as an example, a new single pump with wavelength at 1495 nm was installed and activated to increase the wavelength of the fiber optic system out to 1613.5 nm.. In this manner, 52 more L-band channels from 1570.4 to 1613.5 nm were added to the example fiber optic system thereby upgrading the bandwidth of the example fiber optic system to include both the C-band and the L-band. Then, in accordance with one embodiment of the present invention, at least one pump wavelength was chosen and the power of the corresponding pump was adjusted to minimize gain ripple. More specifically, in this example, the powers of the initially provided pumps at wavelengths of 1426.5 nm and 1455 nm were adjusted, together with the power of the new pump at wavelength of 1495 nm. In addition, the total power was maintained at 400 mW resulting in the following pump powers at the above noted wavelengths:

| Pump Power (mW) | Wavelength (nm) |
|---|---|
| 155 | 1426.5 |
| 130 | 1455 |
| 115 | 1495 |

As can be seen in line 34 of FIG. 3 that represents the gain of the fiber optic system after the upgrade including the adjustments to the power of the pumps as noted above, the gain characteristics of the example fiber optic system is similar to the original C-band gain despite the increase in bandwidth since the gain ripple is also minimized. Although in the present example, the overall gain is reduced by up to approximately 3 dB due to the total power restriction as compared to the overall gain of before the upgrade represented by line 32, it should be noted that in other embodiments, removing the total power restriction would allow the gain to be maintained as well. Thus, in accordance with the present method for upgrading bandwidth, gain ripple is minimized by adjusting the power of at least one of the pump wavelength in the upgraded fiber optic system after increasing the bandwidth of a fiber optic system.

Considerations have also been given by the present inventors to the possible commercial implementations of fiber optic systems to facilitate the future upgrade in accordance with the present invention. The inventors have found that to upgrade a fiber optic system having C-band capacity to include L-band capacity, the up front cost of including L-band pumps (to be used in the future) during the first installation of the fiber optic system is smaller than the analogous case of upgrading a fiber optic system having L-band capacity to also include C-band capacity. This discrepancy is due to the fact that L-band pump power requirements are substantially lower than C-band pump power requirements and the fact that C-band pump power is not only transferred to the signals, but also to the C-band pumps. Thus, including L-band pumps (to be used in the future) during the first installation of the fiber optic system for initial use in the C-band offers immediate bandwidth flexibility and is very economical. Moreover, the lower pump power requirements for L-band may be satisfied with a single pump diode and a polarization scrambling element rather than two polarization multiplexed diodes.

In the case of upgrading a fiber optic system having L-band capacity to also include C-band capacity, the present inventors have found that it may be preferable to immediately provide the passive components required to add C-band capacity (at a later time), but not the pump laser diodes which are more costly. In addition, because the C-band pump powers are greater and all component costs have historically been falling over time, this allows the system provider to spread out costs over time and pay less overall for the system.

Figure 4:
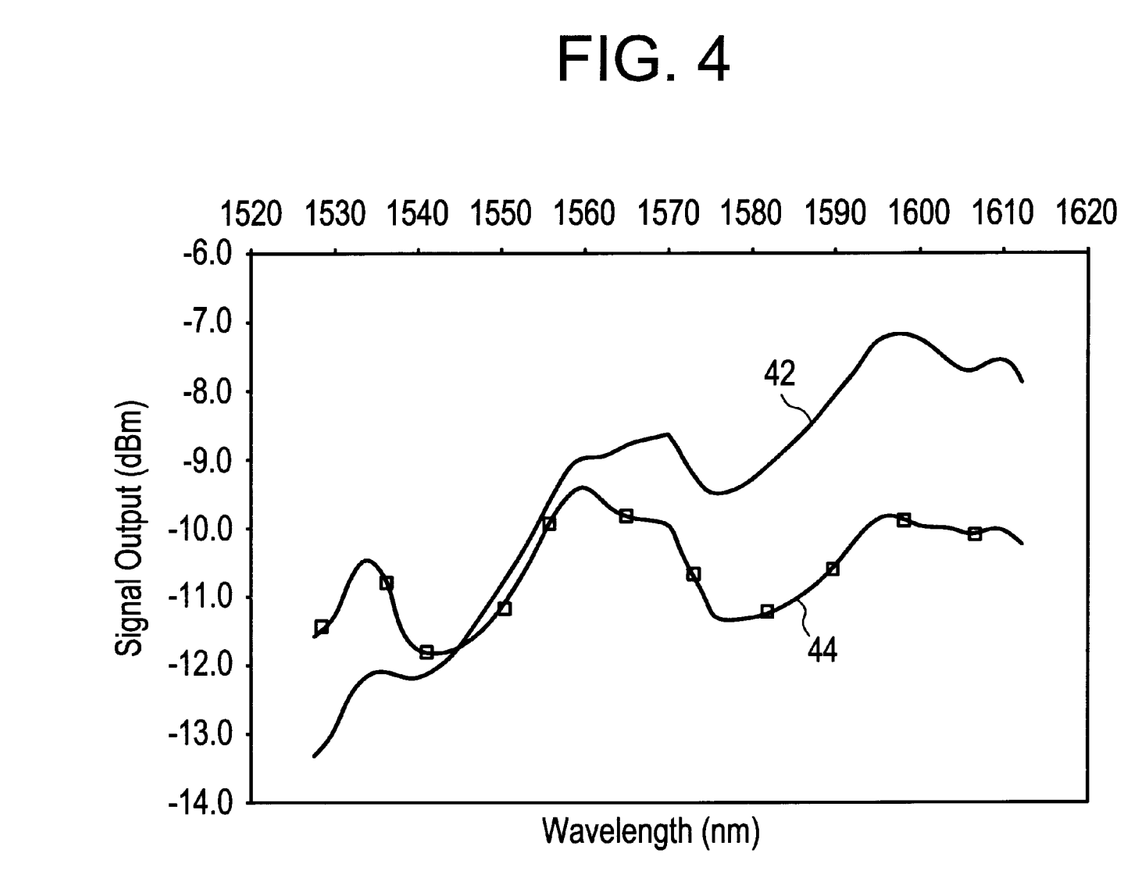
FIG. 4 shows gain characteristics of an example fiber optic system after an upgrade using a method of the present invention in both C-band and L-band and adjusting the pump powers to minimize signal output ripple.

FIG. 4 shows gain characteristics of an example fiber optic system after an upgrade using the method of the present invention in both C-band and L-band and adjusting the pump powers to minimize signal output ripple. As noted previously, it is known that signals can interact with each other to create signal-to-signal induced Raman gain even without the presence of pumps. In addition, the attenuation of the transmission fiber inherently has spectral variation. Both of these effects can be compensated by practicing an embodiment of the present invention where the signal output ripple is minimized so that a relatively flat signal output can be achieved. Line 42 of FIG. 4 illustrates the signal output that results if the powers of the pumps are adjusted to minimize gain ripple as discussed above relative to FIGS. 2 and 3. As can be seen, the signal output of line 42 exhibits significant spectral tilt toward the longer wavelengths. Line 44 of FIG. 4 illustrates the signal output that results of the powers of the pumps are adjusted to minimize signal output ripple. As can be seen, the spectral tilt has been significantly attenuated as compared to line 42. It should also be noted that the same pump wavelengths were used to attain the results of line 44 as in the results attained for FIGS. 2 and 3 but, of course, different pump powers were used. In this regard, the following pump powers were used at the corresponding wavelengths:

| Pump Power (mW) | Wavelength (nm) |
|---|---|
| 240 | 1426.5 |
| 110 | 1455 |
| 50 | 1495 |

Thus, the same wavelengths can be used in adjusting the power of at least one pump to minimize gain ripple or signal ripple in accordance with the present invention.

Figure 5:
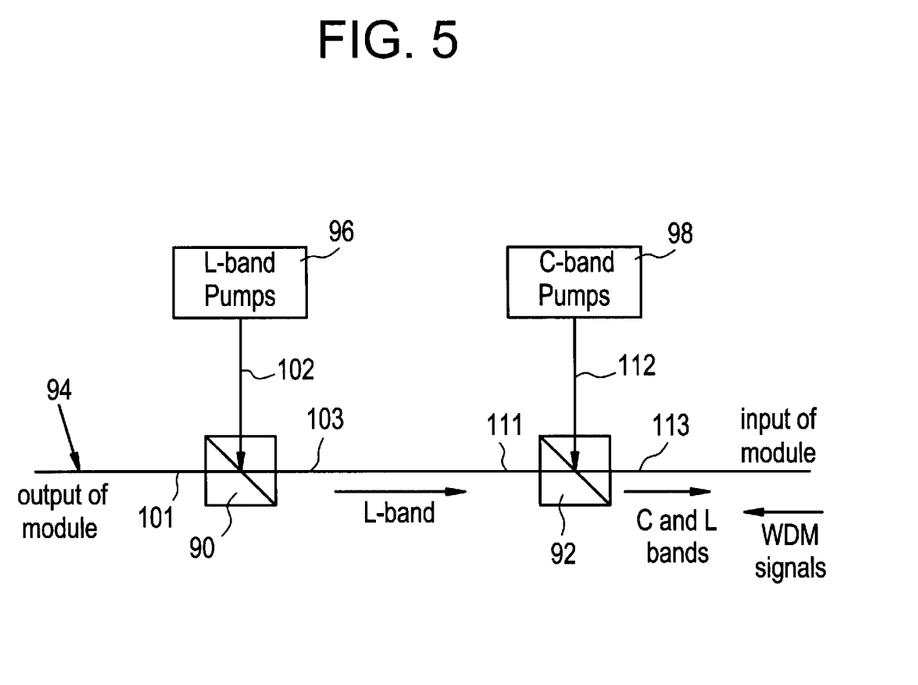
FIG. 5 shows a schematic of an optical system which was upgraded in accordance with the present invention.

FIG. 5 shows a schematic illustration of a preferred placement of wavelength division multiplexing (WDM) components such as couplers 90 and 92 to that allow addition of L-band and C-band pump power respectively on to the signal fiber 94. In this regard, L-band pumps 96 may be coupled to the signal fiber 94 by the L-band coupler 90 while the C-band pumps 98 may be coupled to the signal fiber 94 by C-band coupler 92. The present inventors observed that only the C-band pumps 98 are effected by the loss of one WDM coupler, this being advantageous since they are typically higher power and more expensive. The addition of the C-band through coupler 92 is also easier to attain than if the C-band and L-band pump WDM coupler order is reversed from as shown in FIG. 5. In this preferred placement, the C-band coupler 92 needs only one transmission/reflection transition. Preferably, all wavelengths greater than approximately 1460 nm are designed to pass through optical ports 111 and 113. In addition, all wavelengths less than approximately 1460 nm are preferably designed to pass through optical ports 112 and 113. Thus, wavelength division multiplexer coupler 92 adds the C-band pump's 98 wavelengths to the signal fiber 94, and a separate wavelength division multiplexer coupler 90 adds the L-band pump's 96 wavelength to the signal fiber 94. Moreover, the order of the couplers 90 and 92 are such that the L-band wavelengths pass through the C-band coupler 92 but the C-band wavelengths do not pass through the L-band coupler 90. If the order of the WDM couplers were reversed, the L-band coupler 90 would need to be a notch filter, passing intermediate wavelengths from 1460–1500 nm through optical ports 102 and 103 and passing wavelengths less than 1460 nm and greater than 1500 nm through optical ports 101 and 103.

Lastly, another possibility is to provide all the required pumps upon the initial installation of the fiber optic system but to not activate the pumps that are not needed until a bandwidth upgrade is desired thereby increasing the usable life expectancy of the pumps. However, this implementation would be costly since all of the required pumps are provided and installed up front even though they will not be fully utilized.

In conclusion, regardless of the strategy utilized for the initial fiber optic system, the method in accordance with the present invention described above may be used to for upgrade bandwidth of such fiber optic system. The upgrading bandwidth in an fiber optic system utilizing Raman amplification is very important especially in view of the continued increased demand for bandwidth. The method for upgrading bandwidth in accordance with the present invention discussed in detail above to provides a general approach to handling the complexity of the nonlinear Raman amplification and interactions involved in such an upgrade. In this regard, a specific example of a distributed amplification system has been discussed for upgrading a fiber optic system having C-band capacity to include L-band capacity in accordance with the present method thereby increasing bandwidth. However, it should again be noted that the method of the present invention is also equally applicable to upgrade a fiber optic system having L-band capacity to include C-band capacity. In addition, as also previously noted, the present method may also be used to upgrade the bandwidth of discrete Raman amplifiers and/or loss-less dispersion compensating modules (DCMs). Discrete amplifiers and DCMs may be components in which the fiber is coiled in a box. Furthermore, the present invention may also be applied in a single high loss span, to extend span distances, or to improve noise accumulation with the added loss of wavelength switching and routing elements.

While various embodiments in accordance with the present invention have been shown and described, it is understood that the present invention is not limited thereto. The present invention may be changed, modified and further applied by those skilled in the art. Therefore, this invention is not limited to the details shown and described previously, but also includes all such changes and modifications.

What is claimed is:

1. A method for upgrading bandwidth in a fiber optic system comprising the steps of:
   identifying a fiber optic system to be upgraded, the fiber optic system utilizing Raman amplification and having an initial band capacity provided by at least one existing pump;
   activating at least one new pump in the fiber optic system necessary to provide upgraded band capacity to the fiber optic system while retaining the initial band capacity provided by the existing pump; and
   adjusting power of at least one of the existing pump and the new pump of the fiber optic system to minimize at least one of gain ripple and signal output ripple,
   wherein the initial band capacity of the fiber optic system before the upgrade includes one of C-band and L-band capacity, and the upgraded band capacity includes one of a C-band and at least a portion of said L-band, and an L-band and at least a portion of said C-band.

2. The method of claim 1, wherein the fiber optic system is at least one of a fiber optic network, a segment of a fiber optic network, a discrete Raman amplifier, and a loss-less dispersion compensating module.

3. The method of claim 1, wherein at least one of the existing pump and the new pump of the fiber optic system is Fabry-Perot type semiconductor laser diode pump.

4. The method of claim 1, further including the step of installing the at least one new pump necessary to provide upgraded band capacity to the fiber optic system before activating the at least one new pump.

5. The method of claim 1, wherein the fiber optic system includes at least three existing pumps, at least one being adjusted to minimize gain ripple.

6. The method of claim 1, wherein the initial band capacity of the fiber optic system before the upgrade includes C-band capacity, and the upgraded band capacity includes L-band capacity.

7. The method of claim 6, wherein the step of adjusting power of at least one of the existing pump and the new pump of the fiber optic system includes adjusting the power of the at least one existing pump that provides initial C-band capacity to minimize gain ripple.

8. The method of claim 6, wherein the step of adjusting power of at least one of the existing pump and the new pump of the fiber optic system includes adjusting the power of the at least one existing pump that provides initial C-band capacity to minimize signal output ripple.

9. The method of claim 1, wherein the initial band capacity of the fiber optic system before the upgrade includes L-band capacity, and the upgraded band capacity includes C-band capacity.

10. The method of claim 9, wherein the step of adjusting power of at least one of the existing pump and the new pump of the fiber optic system includes adjusting the power of the at least one existing pump that provides initial L-band capacity to minimize gain ripple.

11. The method of claim 9, wherein the step of adjusting power of at least one of the existing pump and the new pump of the fiber optic system includes adjusting the power of the at least one existing pump that provides initial L-band capacity to minimize signal output ripple.

12. The method of claim 1, wherein linear gain/tilt of the fiber optic system is corrected with a variable optical attenuator in an in-line erbium-doped fiber amplifier.

13. The method of claim 12, wherein at least one of the existing pump and the new pump of the fiber optic system is a Fabry-Perot type semiconductor laser diode pump.

14. The method of claim 12, further including the step of installing the at least one new pump necessary to provide upgraded band capacity to the fiber optic system.

15. The method of claim 14, wherein the fiber optic system includes at least three existing pumps, at least one being adjusted to minimize gain ripple.

16. The method of claim 14, wherein the at least one new pump is adjusted to minimize signal output ripple.

17. The method of claim 14, wherein the initial band capacity of the fiber optic system before the upgrade includes C-band capacity, and the upgraded band capacity includes L-band capacity.

18. The method of claim 14, wherein the initial band capacity of the fiber optic system before the upgrade includes L-band capacity, and the upgraded band capacity includes C-band capacity.

19. The method of claim 14, further including the steps of providing a C-band wavelength division multiplexer (WDM) coupler that allows addition of wavelengths of a C-band pump to a signal fiber, and providing a separate L-band wavelength division multiplexer (WDM) coupler that allows addition of wavelengths of an L-band pump the signal fiber, wherein the WDM couplers are ordered in a manner that the L-band wavelengths pass through the C-band WDM coupler but the C-band wavelengths do not pass through the L-band WDM coupler.

20. The method of claim 1, further including the steps of providing a C-band wavelength division multiplexer (WDM) coupler that allows addition of wavelengths of a C-band pump to a signal fiber, and providing a separate L-band wavelength division multiplexer (WDM) coupler that allows addition of wavelengths of an L-band pump the signal fiber, wherein the WDM couplers are ordered in a manner that the L-band wavelengths pass through the C-band WDM coupler but the C-band wavelengths do not pass through the L-band WDM coupler.

21. The method of claim 1, wherein said upgraded capacity includes one of a C-band and a substantial portion of said L-band, and an L-band and at least a substantial portion of said C-band.

22. A method for upgrading bandwidth in a fiber optic system utilizing Raman amplification, comprising the steps of:

identifying a fiber optic system to be upgraded, the fiber optic system having a Raman amplifier with an initial band capacity provided by at least one existing pump;

activating at least one new pump in the Raman amplifier of the fiber optic system to provide substantially upgraded band capacity to the fiber optic system while retaining the initial band capacity provided by the existing pump;

adjusting power of at least one of the existing pump and the new pump of the fiber optic system to minimize at least one of gain ripple and signal output ripple, and wherein said initial band capacity includes a first range of optical wavelengths, and said upgraded band capacity includes a second range of optical wavelengths that is broader than said first range by at least 8 nanometers.

* * * * *